United States Patent
Garner et al.

(10) Patent No.: US 6,517,695 B1
(45) Date of Patent: Feb. 11, 2003

(54) LOW TEMPERATURE CURING CATHODIC ELECTROCOAT

(75) Inventors: Archie W. Garner, Fishers, IN (US); John D. McGee, Avon, IN (US)

(73) Assignee: Lilly Industries, Inc., Indianapolis, IN (US)

( * ) Notice: Subject to any disclaimer, the term of this patent is extended or adjusted under 35 U.S.C. 154(b) by 0 days.

(21) Appl. No.: 09/702,393

(22) Filed: Oct. 31, 2000

(51) Int. Cl.⁷ .................................................. C25F 13/00
(52) U.S. Cl. ....................... 204/505; 423/415
(58) Field of Search ........................ 204/505; 423/415

(56) References Cited

U.S. PATENT DOCUMENTS

| | | | |
|---|---|---|---|
| 4,017,438 A | 4/1977 | Jerabek et al. | |
| 4,031,050 A | 6/1977 | Jerabek | |
| 4,246,151 A | 1/1981 | Dohy et al. | |
| 4,596,744 A | * | 6/1986 | Anderson et al. ........ 204/181.7 |
| 5,591,788 A | * | 1/1997 | Anderson et al. ........... 204/489 |

FOREIGN PATENT DOCUMENTS

EP    0 189 728    8/1986

OTHER PUBLICATIONS

Yang et al., Syntheses and Properties of Cationic Amine–Epoxy Adducts and Their Use in Electrodeposition: I. Diethanolamine/Diethylamine Terminated Cationic Epoxy with Pendant 2–Ethylhexanol–Blocked TDI Groups, J. Applied Polymer Science, vol. 42, No. 4, pp. 1097–1105 (1991).

* cited by examiner

Primary Examiner—Kishor Mayekar
(74) Attorney, Agent, or Firm—Barnes & Thornburg

(57) ABSTRACT

This invention is directed to a highly stable composition and application process for cathodic electrodeposition of a coating which is thermally curable at very low baking temperatures. The invention provides both long-term stability of the bath composition prior to application and highly crosslinked corrosion resistant films when cured at baking temperatures as low as 93° C.

18 Claims, No Drawings

LOW TEMPERATURE CURING CATHODIC ELECTROCOAT

FIELD OF THE INVENTION

The present invention relates to cathodic electrocoats which are thermally curable at low baking temperatures. More particularly, the invention relates to cathodic electrocoats comprising an epoxy-based resin and an oxime-blocked isocyanate crosslinker capable of curing at temperatures as low as 93° C.

BACKGROUND AND SUMMARY OF THE INVENTION

Electrodeposition coatings have found utility for the corrosion protection of metallic objects ranging from automobile parts to appliances, to a wide range of industrial fixtures. Such coatings are typically thermally cured at bake temperatures ranging from 150° C. to 200° C. Factors which would make it desirable to cure at significantly lower temperatures include energy savings and the ability to electrocoat heavy metal castings or metal configured with plastic parts without risk of deformation of the plastic due to heating at high temperatures.

The present invention relates to a low-temperature curing cathodic electrocoat composition which comprises an epoxy-based resin containing primary amine and hydroxyl functionality, an acid solubilizer in an amount greater than the stoichiometric equivalent of amine functionality in the resin, and an oxime-blocked aromatic isocyanate crosslinker and a method for application of this composition. Surprisingly, this composition and method result in high degrees of cure at baking temperatures as low as 93° C. without use of external catalysts and yet provide long term stability of the isocyanate crosslinker in the presence of alcoholic co-solvents in the electrocoat bath prior to application of the electrocoat. The coating composition of the present invention exhibits excellent cure response, impact resistance, and hardness.

Numerous U.S. Patents disclose the use of blocked isocyanates as crosslinkers for film forming compositions in the cathodic electrodeposition process. U.S. Pat. Nos. 3,894,922; 3,947,339; 3,984,299; 3,959,106; 4,017,438; 4,038,232; 4,031,050, 4,101,486; 4,134,816; 4,260,697; 4,297,255; 4,310,646; 4,393,179; 4,176,221; 4,182,831; 4,182,833; 4,225,478; 4,225,479; 4,339,369; 4,452,681; 4,452,930; and 4,452,963 disclose various blocked isocyanate crosslinkers which will deblock at temperatures below 160° C., such as oxime-blocked isocyanates. U.S. Pat. No. 4,596,744 discloses the use of an oxime-blocked isocyanate crosslinker in which the oxime blocking agents are the reaction products of acyclic aliphatic carbonyl-containing compounds having at least seven carbon atoms and a hydroxyl amine. U.S. Pat. Nos. 3,935,087; 3,947,338; 4,007,154; 4,009,133; 4,040,924; 4,081,343; 4,134,865; and 4,134,866 disclose the use of partially blocked isocyanate crosslinkers which will deblock at temperatures below 160° C. and which are reacted with base cationic resins that are useful in cathodic electrodeposition formulations.

Other patents disclose low temperature cured cathodic electrodeposited coatings which do not cure via oxime-blocked isocyanates. U.S. Pat. No. 4,435,559 discloses the use of beta-hydroxy urethane crosslinkers which are appreciably cured at 121° C. and produce excellent cures at 163° C. U.S. Pat. No. 4,440,612 discloses a coating comprising a polymeric polyol with a polyester crosslinking agent having at least two beta-alkoxyester groups per molecule which cures from about 150° C. to about 205° C. in 10 to 45 minutes. U.S. Pat. No. 4,452,930 teaches the use of glycolamides as blocking agents for low temperature curing (121° C. or greater) systems based on blocked isocyanates.

It has been desired for many years to develop cathodic electrodeposition products which will cure at low baking temperatures. The principal challenge in developing such electrocoat compositions is the inherent tendency of crosslinkers which deblock at low temperatures to undesirably prematurely react with other film-forming resins in the bath composition, with co-solvents in bath composition or with water used in the electrocoat bath composition. Many different approaches have been taken to overcome this problem, each with limitations. For example, U.S. Pat. Nos. 4,575,523 and 4,575,529 teach the use of oxime-blocked isocyanates in low temperature cure electrocoat bath compositions, but those compositions cure at higher temperatures than the compositions of the present invention. U.S. Pat. No. 4,872,961 teaches that a reduced curing temperature can be achieved using an isocyanate crosslinker that deblocks below 160° C., but the use of solvents which are non-reactive with the crosslinker is required. In the present invention, the presence of alcoholic co-solvents within the uncured deposited film does not inhibit cure of the coating such that films with good solvent resistance are provided even when formulated with significant levels of glycol ethers such as ethylene glycol monobutyl ether. Thus, the compositions of the present invention exhibit a high degree of cure at low temperature and provide long-term stability of the crosslinker in the electrocoat solution, even in the presence of alcoholic co-solvents, avoiding the limitations associated with conventional methods including other methods employing oxime-blocked isocyanates.

Accordingly, important aspects of the invention are that curing can be accomplished at low baking temperatures and in the presence of alcoholic co-solvents, such as glycol ethers, which are frequently highly desirable. Such co-solvents are desirable in that they are useful in the manufacture of resin intermediates, they improve the stability of many cationic resin dispersions, and they generally positively influence the appearance of the final cured paint film by improving smoothness and glossiness. A disadvantage of conventional methods of application of electrodeposition products containing blocked isocyanates, is that baking temperatures ranging from 163° C. to 200° C. are used to unblock the blocked isocyanates and begin crosslinking. At these temperatures alcoholic co-solvents are driven from the film via evaporation. Furthermore, in conventional methods the alcoholic co-solvent can compete with the polymer for reaction with the crosslinker to effectively reduce crosslink density. In contrast, in the present invention the primary amine functionality of the resin is highly salted reducing its reactivity and resulting in stabilization of the crosslinker which prevents reduction of crosslink density by the co-solvent. Thus, in the present invention alcoholic co-solvents are retained and inhibition of cure of the coating is minimized in the presence of alcoholic co-solvents resulting in films with good solvent resistance even when formulated with significant levels of commonly used glycol ethers such as ethylene glycol monobutyl ether.

In one embodiment of the present invention a low temperature curing cathodic electrodeposition coating composition is provided. The composition comprises an aqueous dispersion of an epoxy-based resin having primary amine and hydroxyl functionality, an acid solubilizer in an amount greater than the stoichiometric equivalent of amine functionality in the resin, and an oxime-blocked aromatic polyisocyanate crosslinker. In a preferred embodiment of the invention the epoxy resin is a bis-phenol A-based epoxy resin reacted with the ketimine of diethylene triamine. The pH of the electrodepositable coating composition is preferably maintained at a pH of from about 3.5 to about 5. The primary amine equivalent weight based on resin solids is from about 280 to about 4000 grams/equivalents of primary amine. The electrodepositable coating composition may further comprise alcoholic co-solvents, a monofunctional phenolic compound for use as a capping agent, an external catalyst to promote curing, a pigment, other cationic pigment dispersion resins, and/or other formulating additives known in the art.

Exemplary of aromatic polyisocyanate crosslinkers are such crosslinkers as diphenyl methane diisocyanate or toluene diisocyanate, and such oxime-blocking agents as methyl ethyl ketoxime or acetone oxime may be used. Lactic acid and acetic acid are examples of acid solubilizers that may be used in accordance with the present invention.

In another embodiment of the invention a method of cathodic electrodeposition is provided. The method comprises the steps of immersing into a bath containing an aqueous dispersion of any of the above-described compositions a substrate to be coated wherein the substrate has the capacity to act as an electrically conductive cathode, maintaining the pH of the bath at about 3.5 to about 5, applying a voltage for a time sufficient to allow electrodeposition of resin components on the surface of the substrate, and heating the coated substrate at a temperature of from about 93° C. to about 350° C. for a time sufficient to allow crosslinking of the resin components by unblocked aromatic polyisocyanates. In a preferred embodiment of the invention the pH of the bath is maintained at about 4 during electrodeposition, and the temperature of the bath is maintained at about 25° C., and the coated substrate is heated to a temperature of about 93° C. to about 135° C. during crosslinking of the resin.

In yet another embodiment of the invention an article of manufacture prepared in accordance with any of the above-described methods is provided.

DETAILED DESCRIPTION OF THE INVENTION

A blocked isocyanate according to this invention is defined as an isocyanate reaction product which is stable to amine or hydroxyl groups at room temperature but dissociates to regenerate an isocyanate functionality when heated.

Blocked isocyanates of the present invention comprise combinations of aromatic poly-isocyanates and oximes, wherein the oxime is used to substantially or completely react with the isocyanate. Representative examples of aromatic compounds for use in the blocked isocyanates of the present invention include m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2',5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, or simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol, and polyethers, i.e., alkylene oxide condensates of the above. Among the alkylene oxides that may be condensed with these polyols to form polyethers are ethylene oxide, propylene oxide, butylene oxide, styrene oxide, and the like. These are generally termed hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol, and mixtures thereof. Other types of polyoxyalkylene glycol ethers can also be used. Especially useful polyether polyols are those derived from reacting polyols such as ethylene glycol, diethylene glycol, triethylene glycol, 1,4-butylene glycol, 1,3-butylene glycol, 1,6-hexanediol, and mixtures thereof, glycerol, trimethylolethane, trimethylolpropane, 1,2,6-hexanetriol, pentaerythritol, dipentaerythritol, tripentaerythritol, polypentaerythritol, sorbitol, methyl glucosides, sucrose, and the like, with alkylene oxides such as ethylene oxide, propylene oxide, and mixtures thereof.

Blocked isocyanates have been reviewed extensively by Z. W. Wicks, Jr. in "Progress in Organic Coatings", pp. 73–99, vol. 3, 1975 and pp. 3–28, vol. 9, 1981. Numerous suitable blocked isocyanates are described in these articles which are incorporated herein by reference. Preferred blocking agents for the blocked polyisocyanates used in the present invention are the oximes. Oximes of ketones, also known as ketoximes, are particularly suitable due to their tendency to deblock at low temperatures, thus providing a coating composition which can be cured at low temperatures. Such blocking agents include methyl ethyl ketone oxime, acetone oxime, and cyclohexanone oxime.

The blocking agent of the present invention is employed in amounts which provide enough blocking agent to react with substantially all of the isocyanate groups contained in the isocyanate crosslinker. In general, a slight molar excess of oxime is used relative to isocyanate groups. A preferred range for the molar ratio of oxime to isocyanate is about 1.01 to about 1.25, and a more preferred range for the molar ratio is about 1.04 to about 1.10. The blocked isocyanates are prepared by the addition of blocking agent to polyisocyanate at ambient temperatures in the absence of catalyst. Due to the exothermic nature of the reaction, the addition rate of blocking agent is controlled in order to control the reaction temperature (i.e., the polyisocyanates and the blocking agents are preferably mixed at temperatures no higher than 80° C. and, preferably below 50° C.).

Any previously disclosed primary amine functional epoxy resins for use in cathodic electrocoat compositions may be used in the present invention. For example, U.S. Pat. No. 4,031,050 describes electrodeposition resins which are the reaction products of an epoxy-based resin and primary or secondary amines. U.S. Pat. No. 4,017,438 describes reaction products of epoxy-based resins and blocked primary amines. U.S. Pat. Nos. 3,962,165; 3,975,346; 4,001,101 and 4,101,486 disclose cationic electrodeposition resins which are reaction products of an epoxy-based resin and tertiary amines. U.S. Pat. Nos. 3,959,106, and 3,793,278 describe cationic electrodeposition resins which are epoxy-based resins having sulfonium salt groups, and U.S. Pat. No. 4,383,073 describes cationic electrodeposition resins which are epoxy-based resins having carbamoylpyridinium salt groups. U.S. Pat. No. 4,419,467 discloses epoxy-based resins reacted with primary, secondary and tertiary amine groups as well as quaternary ammonium groups and ternary sulfonium groups.

The preferred class of electrodepositable resins are the epoxy-based resins, particularly those resins containing a glycidyl ether of a dihydric phenol which has been advanced with a dihydric phenol such as bisphenol A. Conventional epoxy resins obtained by reacting liquid glycidyl ethers of bisphenol A with bisphenol A are among the more specific examples of suitable epoxy-based resins. Useful glycidyl ethers of dihydric phenols include those represented by the formulas:

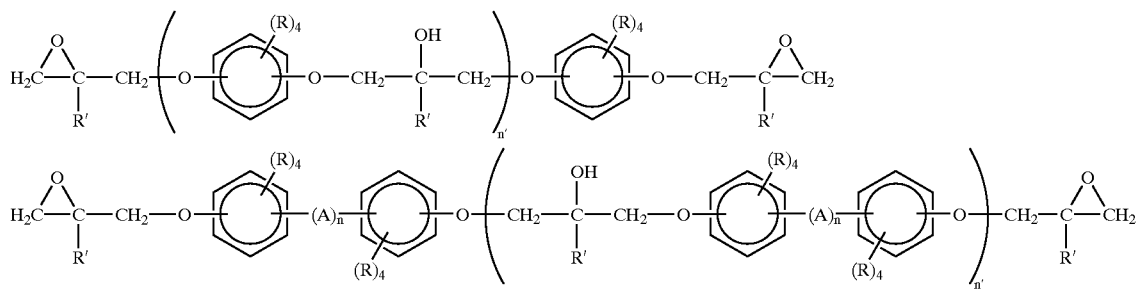

wherein each A is independently a divalent hydrocarbon group having suitably from 1 to about 12, more suitably from 1 to about 6, carbon atoms, —S—, —S—S—, —SO—, —SO$_2$—, —O—CO—, or —O—; each R is independently hydrogen, a hydrocarbyl or hydrocarbyloxy group having from 1 to about 4 carbon atoms, or a halogen, preferably chlorine or bromine; each R' is independently hydrogen or an alkyl group having from 1 to about 3 carbon atoms; n has a value from zero to 1; and n' has a value from zero to 40, more suitably from 0.1 to 5.

The term hydrocarbyl as employed herein includes alkyl, cycloalkyl, aryl, aralkyl, alkaryl, and alkenyl groups, and the like. Likewise, the term hydrocarbyloxy as employed herein includes alkyloxy, cycloalkyloxy, aryloxy, aralkyloxy, alkaryloxy, and alkenyloxy groups, and the like.

Polyphenols useful for the production of these polyepoxides include, for example, 2,2-bis(4-hydroxyphenyl)-propane (bisphenol A), 1,1-bis(4hydroxyphenyl)ethane, bis(4-hydroxyphenyl)methane (bisphenol F), p,p'-hydroxybiphenol, resorcinol, and hydroquinone. The particularly preferred polyglycidyl ethers of polyphenols are the diglycidyl ether of bisphenol A and the oligomeric polyglycidyl ethers of bisphenol A.

A preferred cationic electrodeposition resin is obtained by the use of capping agents such as monofunctional phenolic compounds which advantageously provide the ability to reduce the viscosities of the resulting product without chain-extension reactions and, thus, allow control of the average molecular weight and the epoxide content of the resulting resin within certain limits. Use of a monofunctional compound to terminate a portion of the resin chain also reduces the average epoxy functionality of the reaction product.

Examples of useful monofunctional capping agents are monofunctional phenolic compounds such as phenol, tertiary-butyl phenol, cresol, para-nonyl phenol, and higher alkyl substituted phenols. A particularly preferred capping agent is para-nonyl phenol. The number of phenolic groups are chosen so that there will be a stoichiometric excess of epoxide groups. Further, ratios are chosen so that the resulting product will contain the desired concentration of terminal epoxy groups and the desired concentration of resin chain ends terminated by the monophenolic compound after substantially all of the phenolic groups are consumed by reaction with epoxy groups.

The coating compositions of the present invention can be formulated using various relative weight ratios of primary amine functional resin to oxime-blocked aromatic polyisocyanate crosslinker. Typically, the weight ratios of amine functional resin to crosslinker range from about 85:15 to about 55:45, and preferably range from about 75:25 to about 65:35.

The coating compositions of the present invention are formulated using amino-substituted epoxy resins having various amine equivalent weights. A preferred range of amine equivalent weight of the resin component is about 280 to about 4000, more preferably, about 3000.

Many useful catalysts to promote cure are known in the art. Metal oxides and salts can be employed. Particularly preferred are oxides and salts of tin. Examples of other suitable catalysts include ethyltriphenylphosphonium acetate-acetic acid complex, ethyltriphenylphosphonium chloride, bromide, iodide, or phosphate, and tetrabutylphosphonium acetate-acetic acid complex. The amount of catalyst used is that amount which effectively promotes curing of the deposited film. The catalysts are typically used at levels of 0.01 to 0.5 mole percent of the epoxide groups. A typical range for the concentration of catalyst based on solid binder is 0.25 to 3 percent.

A key aspect of the present invention relates to the manner in which the cationic groups are salted or neutralized with acid. Monobasic acids are normally preferred. Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.), hydroxy-functional carboxylic acids (e.g., glycolic acid, lactic acid, etc.), and organic sulfonic acids (e.g., methanesulfonic acid). Presently preferred acids are lower alkanoic acids of 1 to 4 carbon atoms with lactic acid and acetic acid being the most preferred. The anion may be exchanged, by conventional anion exchange techniques. See, for example, U.S. Pat. No. 3,959,106 at column 19. Suitable anions are chloride, bromide, bisulfate, bicarbonate, nitrate, dihydrogen phosphate, lactate, and alkanoates of 1–4 carbon atoms. Acetate and lactate are the most preferred anions.

Conventional operation of cathodic electrocoat baths is carried out at levels less than 100% neutralization of base with acid. Although the primary amine functional resin and oxime-blocked aromatic polyisocyanates of the present invention are unacceptably reactive at such levels, it has been discovered that a high degree of stability can be achieved if an acid solubilizer is used in an amount greater than the stoichiometric equivalent of amine functionality in the resin. To achieve such a level of stability a bath with a pH range of about 3.5 to about 5 is used. More preferably, a bath with a pH of about 4 is used.

The coating compositions of the invention may also optionally contain a pigment. The pigment is typically introduced in the form of a paste which is generally a dispersion of pigment in a cathodic resin. Pigments may be of any conventional type, such as, for example, iron oxides, lead oxides, strontium chromate, carbon black, coal dust, titanium dioxide, talc, barium sulfate, as well as color pigments such as cadmium yellow, cadmium red, chromium yellow and organic pigments such as phthallo blue or green, and the like. The pigment content of the coating composition is usually expressed as the pigment-to-resin weight ratio. In the practice of the present invention, pigment-to-resin weight ratios can be 2:1 or higher. More typically, the pigment-to-resin weight ratios are within the range of about 0.05 to 1:1. In addition to the above ingredients, various fillers, plasticizers, anti-oxidants, ultraviolet light absorbers, flow control agents, surfactants and other formulating additives can be employed if desired. These materials are optional and generally constitute up to about 30 percent by weight of the coating composition based on total solids.

The electrodeposition baths may contain coupling solvents which are water-soluble or partially water-soluble organic solvents for the resinous vehicles used in the practice of the invention. Examples of such coupling solvents include ethylene glycol monomethyl ether, ethylene glycol monoethyl ether, ethylene glycol monobutylether, diethylene glycol monobutylether, ethanol, isopropanol, n-butanol, and the like. Co-solvents used in the practice of this invention are those typically used and known in the art. Sufficient amounts of coupling solvent are used so that a good emulsion resulting in a smooth deposited film is produced. Typically the amount of coupling solvent used will be about 0.5 weight percent to about 10 weight percent of the total weight of the coating bath solution, more typically about 1.0 weight percent to about 5 weight percent, and most preferably about 1.0 weight percent to about 2.0 weight percent. The electrocoat bath composition comprises an aqueous dispersion of the composition of the present invention, the co-solvent, and in most cases a separate dispersion of pigment in a cathodic binder.

The present invention also provides a method of cathodic electrodeposition comprising the steps of immersing into a bath, containing an aqueous dispersion of the composition of any of the above-described compositions, a substrate to be coated wherein the substrate has the capacity to act as an electrically conductive cathode, maintaining the pH of the bath at about 3.5 to about 5, applying a voltage for a time sufficient to allow electrodeposition of resin components on the surface of the substrate, and heating the coated substrate at a temperature of from about 93° C. to about 350° C. for a time sufficient to allow crosslinking of the resin components by unblocked aromatic polyisocyanates.

In the electrodeposition method described above, the aqueous composition is placed in contact with an electrically conductive anode and an electrically conductive cathode, with the surface to be coated being the cathode. The pH of the bath is maintained at about 3.5 to about 5, preferably at about a pH of 4. Upon application of voltage and passage of electric current between the anode and the cathode, while in contact with the bath containing the coating composition, an adherent film of the coating composition is deposited on the cathode. The applied voltage may be varied greatly and can be, for example, as low as one volt or as high as several thousand volts.

Following deposition, the applied wet films are generally rinsed and thermally cured by methods known to those skilled in the art such as in baking ovens or with banks of infrared heat lamps. A broad range of curing temperatures can be employed such as about 93° C. to about 230° C., but preferably curing temperatures of about 93° C. to about 135° C. are used. The method of the invention is applicable to the coating of any electrically conductive substrate, and especially metals such as steel, aluminum, copper, or the like, and the electrodepositable coating composition may be used to provide the first or prime coat and/or topcoats to the part to be coated.

Two conventional methods for determining if coatings are cured are by solvent resistance via a double rub technique described in U.S. Pat. No. 4,404,335 and by the pencil hardness test described in ASTM D3363-74, "Standard Test Method: Method for Film Hardness by Pencil Test" which are incorporated herein by reference.

EXAMPLE 1

A. Preparation of Electrodeposition Resin

To a 3 liter glass reaction vessel equipped with agitator, thermocouple, condenser, and nitrogen inlet was added 850 grams diglycidyl ether of bis-phenol A (Epon 828 from Shell Chemical Co.), 346.8 grams of bis-phenol A, 235.2 grams nonylphenol, 48.0 grams xylene and 1.1 grams of ethyltriphenylphosphonium bromide. The mixture was heated to 149° C. under nitrogen and allowed to exotherm to a peak temperature of 176° C. The batch was cooled to 149° C. and maintained at that temperature for a period of 3.5 hours. At this point, the batch was dried by addition and removal under vacuum of 30 grams of toluene. Upon cooling to 135° C., 95.1 grams of a solution of the ketimine of diethylene triamine (Amicure K22 from Air Products), and 13.1 grams methylethanol amine were added. The batch was cooled to a temperature of 116° C. over one hour and held at that temperature for an additional 1.5 hours. The final resin has a calculated equivalent weight of 2,930 grams/ equivalents primary amine based on solids. Prior to cooling, 290 grams of Bisphenol A ethoxylate (Syn Fac 8009 from Milliken Chemical Co.) and 400 grams of ethylene glycol monobutyl ether were added. Epon is a registered trademark of Shell Oil Company, Amicure is a registered trademark of Air Products and Chemical, Inc., and Syn Fac is a registered trademark of Milliken & Company.

B. Preparation of Crosslinker

To a clean 3 liter reaction vessel equipped with agitator, nitrogen inlet and condenser, 1000 grams of methylene diphenyl-isocyanate (Mondur MR from Bayer), 400 grams of methyl isobutyl ketone, and 683.8 grams of methyl ethyl ketoxime were added over four hours such that the temperature remained below 50° C. The mixture was held at that temperature until all the isocyanate groups had been consumed. Mondur MR is a registered trademark of Mobay Corporation.

C. Aqueous Resin Dispersion

In a one gallon stainless steel pail, 532 grams Resin (example 1A) were combined and mixed with 18.9 grams lactic acid (88%). 161.5 grams crosslinker (Example 1B) were added and mixed. 1000 grams of deionized water was added with mixing over a 20 minute period to form a fine aqueous dispersion.

D. Cathodic Grind Vehicle

To a clean 3 liter reaction vessel equipped with agitator, nitrogen inlet and condenser was added 142.7 grams of dimethyl aminopropyl amine and 7 grams of xylene. The batch was heated to 135° C. at which time 893.5 grams epoxy solution (DER 671-X-75 from Dow) was added over 4.5 hours while maintaining temperature for an additional two hours. The batch was heated to 185° C. and a vacuum was applied to remove 242.5 grams of solvent. Upon cooling to 150° C., 82.1 grams of 1,2-epoxy hexadecane (alpha olefin epoxy C-16 from Union Carbide) and 17.3 grams of ethylene glycol monobutyl ether were added and the batch was maintained at 150° C. for two hours. Upon cooling the batch was reduced with 500 grams of ethylene glycol monobutyl ether.

E. Cathodic Pigment Paste

First, 231.4 grams cathodic grind vehicle (example 1D) were combined with 6 grams of DA1407 (Surfynol 104 from Air Products) and 43.3 grams of lactic acid (88%) and mixed with a cowles blade. While mixing, 29.4 grams of PP2124 (Heliogen Green L8690 from BASF Corp.), 79.9 grams of PP4123 (Hostaperm Yellow H4G from Clairant), 138.9 grams of PP4321 (Mapico Yellow 1075A from Columbian Chemicals Company) and 24.3 grams of PP1005 (titanium dioxide TiONA RCL-9 from SCM Chemicals) were added in order. 288 grams of deionized water was added during the addition of pigment in portions to reduce viscosity. The dispersion was then ground using glass media to a fineness of grind of 7 on the Hegman scale. The media was washed with 86 grams of deionized water which was added to the paste with mixing. Surfynol is a registered trademark of Air Products and Chemical, Inc., Heliogen is a registered trademark of BASF Corporation, Hostaperm is a registered trademark of Hoechst Corporation, Mapico is a registered trademark of Mapico, Inc., and Tiona is a registered trademark of SCM Chemicals, L.C.

F. Cathodic Electrocoat Bath

An electrocoat bath was prepared by combining with mixing 600 grams of aqueous resin dispersion (Example 1C), 83.5 grams of cathodic pigment paste (Example 1E) and 316 grams of deionized water.

Application: Steel panels were electrocoated at 25° C. by application of 150 volts for 90 seconds. After rinsing with deionized water, coated panels were allowed to dry 5 minutes then baked for 30 minutes 121° C.

| Substrate | Film Build | MEK Double Rubs | Pencil Hardness | Scribe Creep |
|---|---|---|---|---|
| B952 P60 | 1.2 mil | 100/pass | 2H | |
| B1000 P60 | 1.2 mil | 100/pass | 2H | 0.8 mm @ 200 hrs. |

EXAMPLE 2

A. Preparation of Electrodeposition Resin

To a 3 liter glass reaction vessel equipped with agitator, condenser, and nitrogen inlet was added 994.2 grams of diglycidyl ether of bis-phenol A (Epon 828), 405.6 grams of bis-phenol A, 104.0 grams of xylene and 1.1 grams of ethyltriphenyl-phosphonium bromide. The mixture was heated to 149° C. under nitrogen and allowed to exotherm to a peak temperature of 163° C. The batch was cooled to 149° C. and maintained at that temperature for a period of 4 hours. At this point, the batch was dried by removal under vacuum of 32 grams of xylene. Upon cooling to 105° C., 131.3 grams of a solution of the ketimine of diethylene triamine (Amicure K22 from Air Products), and 105.2 grams of methylethanol amine were added. The batch was cooled to a temperature of 120° C. over one hour and held at that temperature for an additional 1.5 hours. The final resin had a calculated equivalent weight of 2215 grams/equivalents of primary amine based on solids. Prior to cooling, 290 grams of Bisphenol A ethoxylate (Syn Fac 8009 from Milliken Chemical Co.) and 285 grams of ethylene glycol monobutyl ether were added.

B. Preparation of Crosslinker

To a clean 3 liter reaction vessel equipped with agitator, nitrogen inlet and condenser, 1000 grams of methylene diphenyl-isocyanate (Mondur ML from Bayer), 153.4 grams methyl isobutyl ketone, and 731 grams methyl ethyl ketoxime were added over 4.5 hours such that the temperature remained below 50° C. The mixture was held at that temperature until all the isocyanate groups had been consumed. Mondur is a registered trademark of Mobay Corporation.

C. Aqueous Resin Dispersion

In a one gallon stainless steel pail, 500 grams of Resin (example 2A) were combined and mixed with 47.0 grams of lactic acid (88%) and 70 grams of deionized water. 148.4 grams of crosslinker (Example 2B) were added and mixed. 1220 grams of deionized water was added with mixing over a 20 minute period to form a clear solution.

D. Clear Electrocoat Bath

An electrocoat bath was prepared by combining with mixing 398 grams of aqueous resin dispersion (example 2C) and 602 grams of deionized water.

E. Application

An unpigmented electrocoat bath was prepared and deposited onto steel panels at several intervals of time. After rinsing with deionized water, coated panels were allowed to dry for 5 minutes and then baked for 30 minutes at three temperatures. Solvent resistance was measured as an indication of cure.

| Age of bath at time of Application | MEK Double Rubs (93° C.) | MEK Double Rubs (107° C.) | MEK Double Rubs (121° C.) |
|---|---|---|---|
| 3 months | 100 pass | 100 pass | 100 pass |
| 5 months | 100 pass | 100 pass | 100 pass |

What is claimed is:

1. A cathodic electrodeposition coating composition comprising an aqueous dispersion of an epoxy-based resin having primary amine and hydroxyl functionality, an acid solubilizer in an amount greater than the stoichiometric equivalent of amine functionality in the resin, and an oxime-blocked aromatic polyisocyanate cross linker.

2. The electrodepositable coating composition of claim 1 wherein the aromatic crosslinker comprises a methylene diphenylisocyanate.

3. The electrodepositable coating composition of claim 1 wherein the aromatic crosslinker comprises toluene diisocyanate.

4. The electrodepositable coating composition of claim 1 wherein the oxime-blocking agent is methyl ethyl ketoxime.

5. The electrodepositable coating composition of claim 1 wherein the oxime-blocking agent is acetone oxime.

6. The electrodepositable coating composition of claim 1 further comprising alcoholic co-solvents.

7. The electrodepositable coating composition of claim 1 wherein the epoxy resin is reacted with the ketimine of diethylene triamine.

8. The electrodepositable coating composition of claim 1 wherein the acid solubilizer is lactic acid.

9. The electrodepositable coating composition of claim 1 wherein the acid solubilizer is acetic acid.

10. The electrodepositable coating composition of claim 1 further comprising a pigment.

11. The electrodepositable coating composition of claim 1 wherein the electrodepositable coating is clear.

12. The electrodepositable coating composition of claim 1 wherein the pH of the composition is from about 3.5 to about 5.

13. The electrodepositable coating composition of claim 1 wherein the epoxy-based resin also has tertiary amine functionality.

14. The electrodepositable coating composition of claim 1 wherein the primary amine equivalent weight of the epoxy-based resin is about 280 to about 4000.

15. The electrodepositable coating composition of claim 1 wherein the primary amine equivalent weight of the epoxy-based resin is about 2500 to about 3500.

16. A method of cathodic electrodeposition of a polymeric coating comprising the steps of immersing an electrically-conductive substrate into a bath containing an aqueous dispersion of the composition of claim 1;

maintaining the pH of the bath at about 3.5 to about 5;

applying a potential to promote cathodic electrodeposition of resin components on the surface of the substrate; and heating the coated substrate at a temperature of from about 93° C. to about 350° C. for a time sufficient to promote crosslinking of the resin components.

17. The method of claim 16 wherein the pH of the bath is maintained at about 4 during electrodeposition.

18. The method of claim 16 wherein the coated substrate is heated to about 93° C. to about 135° C. to initiate crosslinking of the resin components.

* * * * *